(12) United States Patent
Kim et al.

(10) Patent No.: US 8,559,506 B2
(45) Date of Patent: Oct. 15, 2013

(54) METHOD AND APPARATUS FOR SCALABLE VIDEO CODING

(75) Inventors: Yong-Hwan Kim, Anyang-si (KR); Jooyoung Yi, Seongnam-si (KR); Jewoo Kim, Seongnam-si (KR); Byeongho Choi, Yongin-si (KR)

(73) Assignee: Korea Electronics Technology Institute, Seongnam-si ( * ) Notice: Subject to any disclaimer, the term of this patent is extended or adjusted under 35 U.S.C. 154(b) by 665 days.

(21) Appl. No.: 12/642,310

(22) Filed: Dec. 18, 2009

(65) Prior Publication Data

US 2011/0110426 A1    May 12, 2011

(30) Foreign Application Priority Data

Nov. 12, 2009 (KR) .................. 10-2009-0109148

(51) Int. Cl.
*H04N 7/12* (2006.01)
*H04N 11/02* (2006.01)
*H04N 11/04* (2006.01)

(52) U.S. Cl.
USPC ............ 375/240.12; 375/240.13; 375/240.14; 375/240.15; 375/240.16; 375/240.17

(58) Field of Classification Search
USPC ....................................... 375/240.12–240.16
See application file for complete search history.

(56) References Cited

U.S. PATENT DOCUMENTS

| | | | | |
|---|---|---|---|---|
| 7,535,383 | B2 * | 5/2009 | Segall et al. ................... 341/50 |
| 7,734,151 | B2 * | 6/2010 | Park et al. ..................... 386/329 |
| 7,742,524 | B2 * | 6/2010 | Jeon et al. ................. 375/240.13 |
| 8,023,569 | B2 * | 9/2011 | Sun ........................... 375/240.26 |
| 8,054,886 | B2 * | 11/2011 | Srinivasan et al. ........ 375/240.21 |
| 8,270,468 | B2 * | 9/2012 | Doser et al. ................... 375/240 |
| 2006/0268991 | A1 * | 11/2006 | Segall et al. ............. 375/240.24 |
| 2007/0014346 | A1 * | 1/2007 | Wang et al. ................ 375/240.1 |
| 2010/0008418 | A1 * | 1/2010 | Wu et al. ................... 375/240.12 |

* cited by examiner

*Primary Examiner* — Chikaodili E Anyikire
(74) *Attorney, Agent, or Firm* — Sughrue Mion, PLLC (57) ABSTRACT

A scalable video coding method is provided. The scalable video coding method includes dividing an enhancement layer into macroblocks; when base_mode_flag or residual_prediction_flag of the macroblock is equal to 1, calculating a reference block coordinate value of a reference layer to refer to in the block up-sampling of the enhancement layer and up-sampling the macroblocks of the enhancement layer using the coordinate value; and coding the up-sampled macroblock. The execution speed of the scalable video codec can be raised and the memory usage required for the spatial inter-layer prediction of the scalable video can be saved.

26 Claims, 10 Drawing Sheets

METHOD AND APPARATUS FOR SCALABLE VIDEO CODING

PRIORITY

This application claims the benefit under 35 U.S.C. §119(a) to a Korean patent application filed in the Korean Intellectual Property Office on Nov. 12, 2009 and assigned Serial No. 10-2009-0109148, the entire disclosure of which is hereby incorporated by reference.

BACKGROUND OF THE INVENTION

1. Field of the Invention

The present invention relates generally to a method and an apparatus for scalable video coding. More particularly, the present invention relates to a method and an apparatus for macroblock based scalable video coding, which can enhance decoding and encoding speed and reduce memory usage.

2. Description of the Related Art

In the recent ubiquitous environment, interest in video communication services, for example, IPTV, mobile IPTV, and mobile broadcasting, through various networks and devices is increasing. In order to satisfy the increasing industrial needs, Scalable Video Coding (SVC) which supports spatial, temporal, and quality scalability within one video stream has been standardized as an amendment 3 of H.264/Advanced Video Coding (AVC) at the end of 2007.

One of the most significant differences between the existing H.264/AVC and the SVC is that inter-layer prediction is added to the SVC. Compared to the existing single-layer coding, computations and memory added to the SVC are mostly for intra, residual, and motion up-sampling operations of the inter-layer prediction.

In the H.264/AVC SVC, three profiles; that is, Scalable Baseline, Scalable High, and Scalable High Intra are added to the existing H.264.AVC standard. The most distinguished feature of the Scalable High profile from the Scalable Baseline profile is the support of interlaced coding tools and Extended Spatial Scalability (ESS). The SVC is specified in Annex G of the H.264 AVC standard, and includes the ESS feature provided for the encoding and the decoding of signals when edge alignment of a base layer macroblock and an enhancement layer macroblock is not maintained. Meanwhile, when the spatial scaling is at the ratio of 2 and the edges of the macroblocks are aligned through different layers, this is regarded as a special case of the ESS, which is referred to as Dyadic Spatial Scalability (DSS).

The ESS supports an arbitrary scaling ratio and an arbitrary cropping offset between the layers. In particular, to support both of the full HD video at the 16:9 aspect ratio and the VGA and QVGA mobile video of the 4:3 aspect ratio through the single encoding, it is necessary to use the H.264/AVC Scalable High profile including the ESS. However, since the up-sampling process increases the computational load in the ESS, a high-speed up-sampling algorithm for the real-time service is required. Also, for the services via various multimedia devices including mobile devices, it is quite necessary to minimize the memory usage.

In this regard, Joint Scalable Video Model (JSVM) 11 is developed based on the H.264/AVC SVC standard and describes intra and residual up-sampling methods for the inter-layer prediction in the ESS. The intra up-sampling and the residual up-sampling used in the JSVM 11 employ Picture-based Intra Up-Sampling (PIC-IUS) and PIC-based Residual Up-Sampling (PIC-RUS) methods which up-sample a Reference Layer (RL) on the picture basis. The up-sampling method of the JSVM 11 in FIG. 1 decodes the RL picture in S11, parses an Enhancement Layer (EL) slice header in S12, and performs the PIC-IUS in S13. Next, when the EL slice is an intra slice in S14, the method performs the EL decoding in S16. When the EL slice is not the intra slice; that is, is the inter slice, the method conducts the residual up-sampling in S15 and then the EL decoding in S16.

Figure 1:
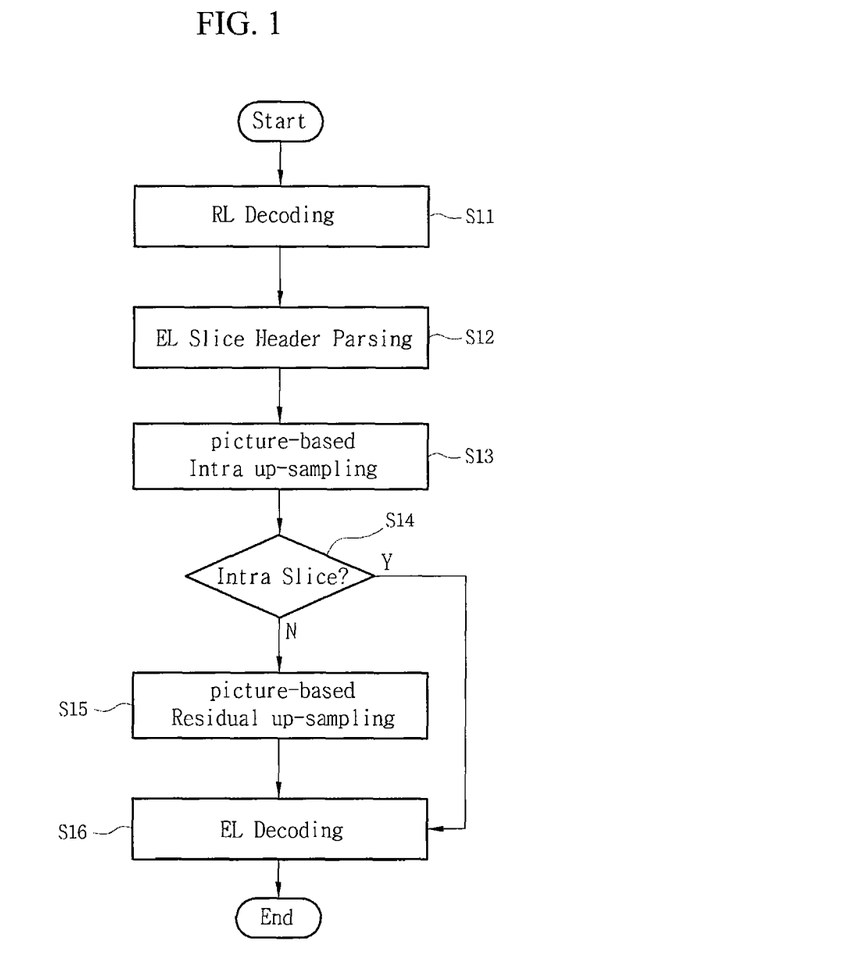
FIG. 1 is a flowchart of conventional picture based intra up-sampling and residual up-sampling methods.

Since in the JSVM 11, up-sampling process is performed in S13 after the RL picture decoding in S11 and the EL slice header parsing in S12 as shown in FIG. 1, which part of the up-sampled RE picture in the actual EL decoding is referred to in the up-sampling process is unknown. Hence, the JSVM 11 up-samples every pixel on the picture basis in advance, stores the up-sampled pixels, and refers to and uses some of the up-sampled picture in the decoding of the EL picture. Meanwhile, since the residual up-sampling does not apply the residual prediction in the intra slice, it performs the up-sampling on the picture basis only for the inter slice as shown in FIG. 1. That is, the up-sampling method described in the JSVM 11 carries out the up-sampling on the picture basis regardless of the reference to the actual up-sampled RL picture in the decoding process of the EL picture. In result, the up-sampling method of the JSVM 11 conducts the up-sampling even for the RE samples not referred to in the EL and thus causes unnecessary operations.

In practice, the occurrence frequency of the inter-layer intra prediction is quite little in the EL inter picture and the occurrence frequency of the inter-layer intra prediction of the intra picture is just 70% or so on average in the 3-layer (SIF/SD/Full-HD) including the ESS. Also, the occurrence frequency of the residual prediction in the EL inter picture is merely 10~30% on average. It doesn't make sense that the up-sampling is applied to the RL sample not referred to in the EL, especially as increasing image size.

Figure 2:
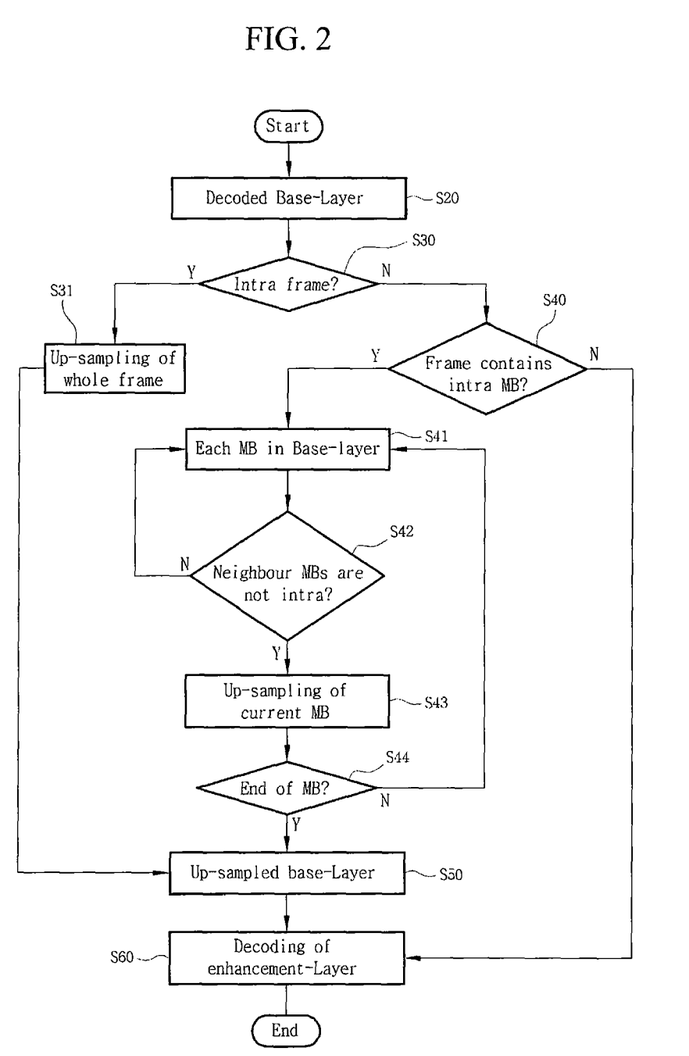
FIG. 2 is a flowchart of a conventional MB based intra up-sampling method of an RL picture.

The high-speed intra up-sampling method in the DSS for optimizing the SVC up-sampling operation rate in FIG. 2 is to reduce the operations by up-sampling only the intra pixels, without up-sampling every pixel of the RL picture. Referring to FIG. 2, when the decoded Base Layer (BL) is the intra frame in S30, the whole frame is up-sampled in S31. Otherwise, the method determines whether the frame includes an intra MacroBlock (MB) in S40. When the intra MB is included and a current MB or neighboring MBs is/are intra with respect to each MB of the BL in S42, the current MB is up-sampled in S43. When the above process is finished for every MB of the BL, the up-sampled picture of the BL is produced in S50 and the EL is decoded in S60.

Figure 3:
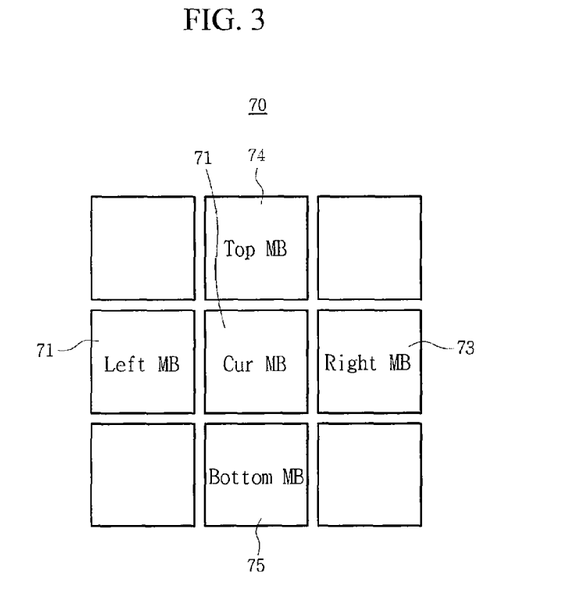
FIG. 3 is a diagram of a current MB and neighbor MBs used in the up-sampling method of FIG. 2.

As for the method of FIG. 2 by referring to FIG. 3, after decoding the RL picture and looping in the RL picture on the MB basis, when at least one of four neighboring MBs (Left, Right, Top, and Bottom MBs in FIG. 3) and the current MB (Cur MB of FIG. 3) is the intra MB, the Cur MB is up-sampled. Otherwise, the up-sampling of the Cur MB is skipped.

The up-sampling method of FIG. 2 with FIG. 3 reduces the operations by selectively performing the intra up-sampling while looping on the MB basis. However, the method is applicable only to the DSS and cannot save the memory. Also, the method is inapplicable to the residual up-sampling but applicable only to the intra up-sampling. Also, the MB not referred to in the EL can be up-sampled unnecessarily and thus unnecessary operations are highly likely to increase.

In the related art, there suggested no apparatus or method for reducing the operations and raising the efficiency of the memory utilization by detecting only the RL block referred to in the EL up-sampling and fulfilling the intra up-sampling and the residual up-sampling.

SUMMARY OF THE INVENTION

An aspect of the present invention is to address at least the above mentioned problems and/or disadvantages and to provide at least the advantages described below. Accordingly, an aspect of the present invention is to provide a scalable video coding method for raising an operation speed of a scalable video codec and reducing memory required for spatial inter-layer prediction of a scalable video.

Another aspect of the present invention is to provide a scalable video coding apparatus for raising an execution speed of a scalable video and reducing memory required for spatial inter-layer prediction of the scalable video.

Yet another aspect of the present invention is to provide a recording medium containing a program to execute a scalable video coding method for raising an execution speed of a scalable video and reducing memory usage.

According to one aspect of the present invention, a scalable video coding method includes generating a base layer and an enhancement layer from an input video signal; dividing the enhancement layer into macroblocks; when base_mode_flag or residual_prediction_flag of the macroblock is equal to 1, up-sampling blocks of a reference layer using coordinates of a reference block which is referred to in up-sampling of a current macroblock coded in the enhancement layer among the blocks of the reference layer; and coding the up-sampled macroblock.

The up-sampling may be divided into intra up-sampling and residual up-sampling. The intra up-sampling may include a first intra up-sampling step and a second intra up-sampling step.

The first intra up-sampling may include, when the base_mode_flag of the macroblock is equal to 1 and when a type of a corresponding block of the reference layer corresponding to the same location as the current macroblock of the enhancement layer among the macroblocks of the reference layer which is referred to in the up-sampling, is intra, intra up-sampling of the corresponding block of the reference layer for inter-layer prediction.

The second up-sampling may include, when the base_mode_flag of the macroblock is equal to 1 and when a type of a corresponding block of the reference layer corresponding to the same location as the current macroblock of the enhancement layer among the macroblocks of the reference layer which is referred to in the up-sampling, is inter, and the corresponding macroblock of the reference layer comprises at least one intra pixel, intra up-sampling of the corresponding block of the reference layer for inter-layer prediction.

The intra up-sampling including the first intra up-sampling and the second intra up-sampling may include calculating the reference block coordinates of the reference layer which is referred to in the intra up-sampling; and up-sampling the macroblock of the enhancement layer based on the coordinates of the reference block.

The scalable video coding method may further include decoding a reference layer picture; and when the reference layer picture is an intra slice, boundary-padding the picture.

The scalable video coding method may further include when the reference layer picture is not the intra slice, padding all boundaries of intra macroblocks within the reference layer picture.

The calculating of the reference block coordinates may include calculating block coordinates of the reference layer corresponding to the coded macroblock of the enhancement layer; and calculating the reference layer block coordinates referred to in the intra up-sampling, using the calculated block coordinates of the reference layer.

The intra up-sampling may up-sample an intra luma sample.

The luma up-sampling may use a 4-tap filter.

The intra up-sampling may up-sample an intra chroma sample.

The chroma up-sampling may use a 2-tap bilinear filter.

The up-sampling of the macroblock may include horizontally up-sampling the macroblock using the coordinates of the reference block; and vertically up-sampling the macroblock using the coordinates of the reference block.

The horizontal up-sampling and the vertical up-sampling may be applied to the luma sample and the chroma sample respectively.

When the residual_prediction_flag of the macroblock is equal to 1, the method may further include residual up-sampling a residual block of the macroblock.

The residual up-sampling step may residual up-sample the macroblock of the enhancement layer by referring to Transform Block Identification (TransBlkIdc) values.

The TransBlkIdc values may be stored to a TransBlkIdc memory which stores different TransBlkIdc values per 4×4 pixel block.

The TransBlkIdc values stored to the TransBlkIdc memory may be calculated for only the luma sample, and the TransBlkIdc values may be not calculated and stored for the chroma sample.

The TransBlkIdc values may be referred to in a 4×4 block boundary when the macroblock of the enhancement layer is the luma sample, and the TransBlkIdc values are not referred to when the macroblock of the enhancement layer is the chroma sample.

The residual up-sampling step may further include decoding a reference layer picture; and boundary-padding the reference layer picture.

The coding may include encoding or decoding.

According to another aspect of the present invention, a scalable video coding apparatus includes a down-sampler for reading a video signal and generating a base layer and an enhancement layer; a macroblock type determiner for determining a type of a macroblock in the enhancement layer divided into macroblocks; an intra up-sampler for, according to a result of the macroblock type determination, when base_mode_flag of the macroblock is equal to 1, up-sampling a corresponding block of a reference layer when a type of a corresponding block of the reference layer corresponding to the same location as the current macroblock of the enhancement layer among the macroblocks of the reference layer which is referred to in the up-sampling is intra, or when the type of the corresponding block of the reference layer is inter and the macroblock of the reference layer comprises at least one intra pixel; a residual up-sampler for residual up-sampling the macroblock when the residual_prediction_flag of the macroblock is equal to 1 according to the result of the macroblock type determination; and a coder for coding the up-sampled macroblock.

The scalable video coding apparatus may further include a preprocessor for boundary-padding a picture when the picture of the reference layer referred to in the up-sampling of the enhancement layer is an intra slice, and padding all boundaries of intra macroblocks of the picture when the picture is not the intra slice.

The intra up-sampler may include a reference block coordinate calculator for calculating coordinates of a reference block to refer to in the up-sampling of the current macroblock in the enhancement layer among blocks of the reference layer which is referred to in the up-sampling of the enhancement layer; a 4-tap filter for up-sampling a luma sample; and a 2-tap filter for up-sampling a chroma sample.

The residual up-sampler may include a reference block coordinate calculator for calculating coordinates of a reference block to refer to in the up-sampling of the current macroblock in the enhancement layer among blocks of the reference layer which is referred to in the up-sampling of the enhancement layer; a 2-tap bilinear filter for up-sampling a luma sample and a chroma sample; and a TransBlkIdc memory for storing TransBlkIdc values as different values per 4×4 pixel block, the TransBlkIdc values referred to in a boundary of a transform block, when the macroblock of the enhancement layer is the luma sample.

According to yet another aspect of the present invention, a computer-readable recording medium contains a program which executes a scalable video coding method comprising generating a base layer and an enhancement layer from an input video signal; dividing the enhancement layer into macroblocks; when base_mode_flag or residual_prediction_flag of the macroblock is equal to 1, up-sampling the macroblock using coordinates of a reference block which is referred to in up-sampling of a current macroblock decoded in the enhancement layer among the blocks of the reference layer; and coding the up-sampled macroblock.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are described in detail by referring to the attached drawings.

Figure 4:
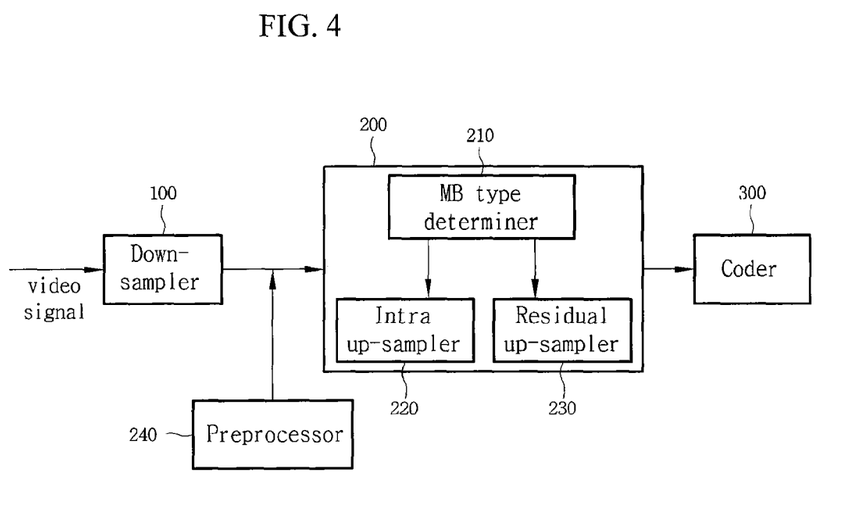
FIG. 4 is a simplified block diagram of a scalable coding apparatus according to an exemplary embodiment of the present invention.

FIG. 4 is a simplified block diagram of a scalable coding apparatus according to an exemplary embodiment of the present invention.

The scalable coding apparatus of FIG. 4 separately performs a picture based process and a MacroBlock (MB) based process. For the picture based preprocess of the relatively low complexity at a preprocessor 240 and the up-sampling process requiring high complexity and much memory at an up-sampler 200, the scalable coding apparatus includes a down-sampler 100, the preprocessor 240, the up-sampler 200, and a coder 300.

When encoding a video signal, the scalable video coding scheme encodes with the highest quality and enables to represent the low-quality video even by decoding a partial sequence (a sequence of the frame intermittently selected from the whole sequence) of the produced picture sequences. The picture sequence encoded using the scalable scheme can represent the low-quality video by receiving and processing only the partial sequence. However, in case that the bitrate is low, a hierarchical structure can be provided with one or more layers as a separate auxiliary picture sequence for the low transfer rate, for example, a small picture and/or a picture sequence of the low frames per second to address the considerable video quality degradation.

When two sequences are given, the auxiliary sequence (the lower sequence) is referred to as a Base Layer (BL) and the main picture sequence (the higher sequence) is referred to as an Enhanced (or Enhancement) Layer (EL). Since the BL and the EL encode the same video signal source, the video signal of both layers has redundant information (redundancy). Accordingly, to raise the coding efficiency of the EL, the video signal of the EL is coded by referring the coded information (motion information or texture information) of the BL.

The down-sampler 100 converts the high resolution video to the low resolution video. The down-sampler 100 receives the video signal and generates the BL and the EL. The scalable encoding of the video data enables a decoder to selectively decode only part of the encoded bit stream. The down-sampling process can adopt bilinear interpolation.

The coded stream includes a plurality of layers arranged, which include a BL and one or more ELs. The down-sampler 100 generates the baselayer stream (the BL) by down-sampling the currently input original video of original videos constituting the moving picture. For example, when the resolution of the original video is High Definition (HD) or Common Intermediate Format (CIF), the down-sampler 100 generates Standard Definition (SD) baselayer stream or Quarter CIF (QCIF) baselayer stream by down-sampling the HD original video or the CIF original video.

The preprocessor 240, which operates before the up-sampling process, performs MB boundary padding and picture boundary padding for the intra up-sampling, generates TransBlkIdc values for the residual up-sampling, and performs the boundary padding of the residual picture.

When a Reference Layer (RL) referred to in the residual up-sampling process is the inter slice, the preprocessor 240 performs residual picture-based boundary padding. The preprocessor 240 calculates TransBlkIdc values for the luma on the 4×4 block basis.

That is, the portion of the low complexity is preprocessed on the picture basis. The conventional method up-samples the RL on the picture basis in the intra up-sampling and the residual up-sampling for the inter-layer prediction of Extended Spatial Scalability (ESS), whereas the present invention carries out only the boundary padding and the preprocessing of the TransBlkIdc calculation on the picture basis and carries out the intra and adaptively residual up-samplings of the high complexity on the MB basis.

The up-sampler 200 performs the MB based up-sampling, only if necessary, on the EL based on the preprocessed RL information. The up-sampler 200 includes an MB type determiner 210, an intra up-sampler 220, and a residual up-sampler 230. To skip the up-sampling on the blocks of the RL not referred to in the EL, it is actually necessary to determine the blocks referred to for the up-sampling in the EL, among the RL blocks.

The MB type determiner 210 determines the blocks of the RL referred to in the up-sampling of the EL. The MB type determiner 210 determines whether the MB type of the EL is "I_BL" or "combined prediction MB". The up-sampling is carried out only when the MB type is "I_BL" or "combined prediction MB". Otherwise, the up-sampling is not conducted. Thus, the intra up-sampling processing speed can be raised. The "I_BL" implies that "base_mode_flag" is equal to 1 in the H.264/AVC SVC standard and simultaneously the type of the MB at the same location of the referred RL is intra in the MB. The "combined prediction MB" implies that "base_mode_flag" of the EL MB is equal to 1, the type of the MB at the same location of the referred RL is inter, and some portion of the RL MB includes the intra sample at the same time.

"base_mode_flag" is the flag defined for the enhancement layer MB in Annex G of H.264/AVC standard. When this flag is equal to 1, type, mode and motion vectors of the MB of the enhancement layer are completely predicted from the MBs of the RL.

When the MB type is "I_BL" or "combined prediction MB", the intra up-sampling is conducted. When "residual_prediction_flag" is equal to 1, the residual up-sampling is conducted together. In "I_BL", residual_prediction_flag is always zero. Herein, the intra up-sampling conducted when the MB type is equal to "I_BL" is referred to as a first intra up-sampling, and the intra up-sampling conducted when the MB type is "combined prediction MB" is referred to as a second intra up-sampling. The first intra up-sampling with the MB type "I_BL" is performed for every DSS and ESS, and the second intra up-sampling with the MB type "combined prediction MB" is performed only for the ESS.

Figure 5:
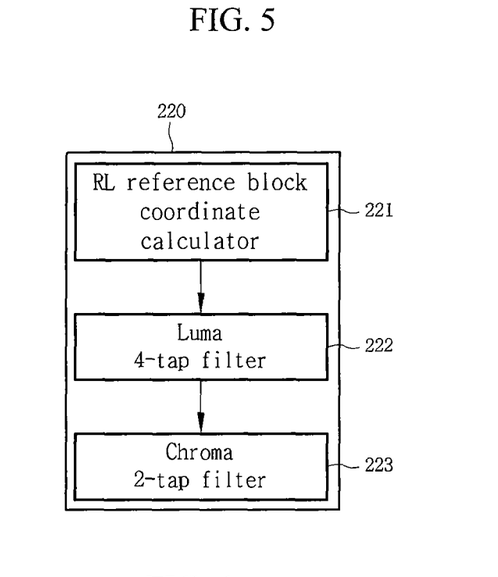
FIG. 5 is a simplified block diagram of an intra up-sampler of the scalable coding apparatus of FIG. 4.

FIG. 5 is a simplified block diagram of the intra up-sampler of the scalable coding apparatus of FIG. 4.

Referring to FIGS. 4 and 5, to fulfill the up-sampling when the MB type of the EL is equal to "I_BL" or "combined prediction MB", the intra up-sampler 220 includes a reference block coordinate calculator 221, a 4-tap filter 222, and a 2-tap filter 223.

Figure 8:
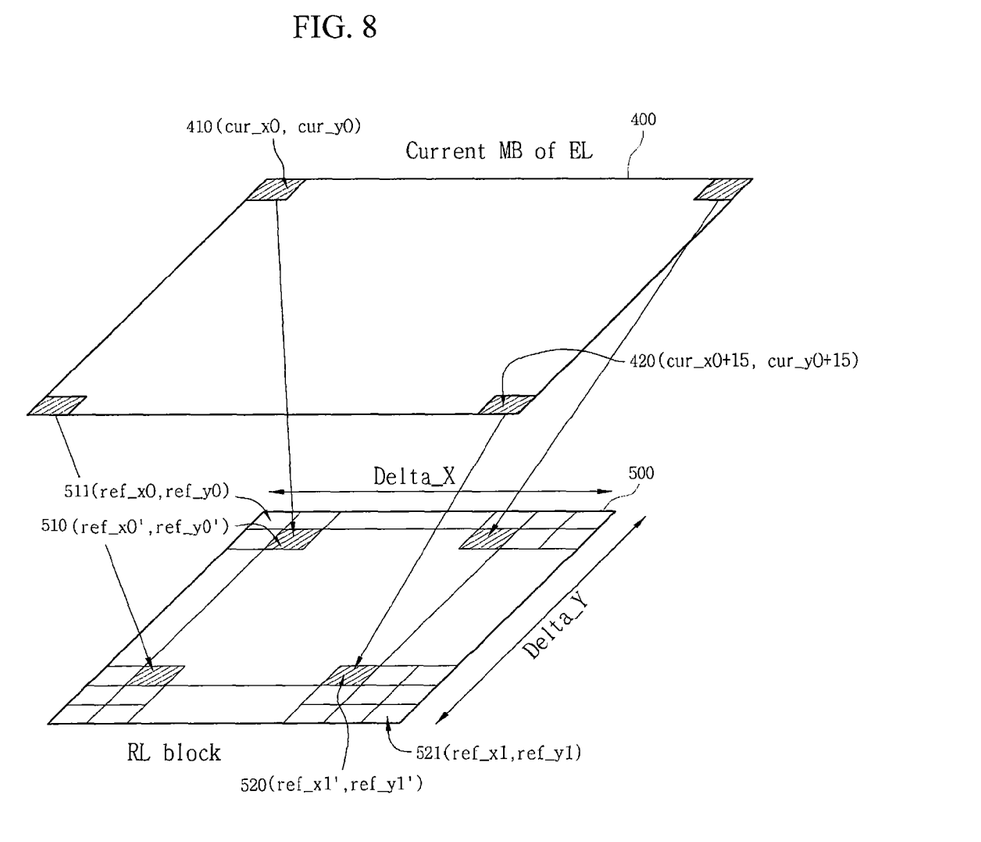
FIG. 8 is a diagram of RL block coordinates corresponding to MB coordinates currently decoded in the intra up-sampling method of FIG. 7.

The reference block coordinate calculator 221 calculates block coordinates of the RL actually referred to for the up-sampling of the EL. The reference block coordinate calculator 221 calculates the coordinates of the block corresponding to the RL to refer to in the up-sampling process of the MB (the current MB) currently decoded in the EL. The calculation of the reference block coordinates is elucidated by referring to FIG. 8. FIG. 8 depicts the EL block coordinates corresponding to MB coordinates currently coded. Referring to FIGS. 4, 5 and 8, the reference block coordinate calculator 221 calculates the coordinates of the reference block as below.

In this exemplary embodiment of the present invention, the reference block coordinate calculator 221 calculates y coordinates ref_y0' 510 and ref_y1' 520 of the RL luma plane 500 corresponding to y coordinates cur_y0 410 and cur_y0+15 420 of the current MB 400 of the EL, based on the H.264/AVC SVC standard. In case of the luma up-sampling, the 4-tap filter 222 is used. Hence, the y coordinates of the RL luma sample actually required for the MB based up-sampling are ref_y0 511 and ref_y1 521 in FIG. 8, and are calculated based on Equation (1) and Equation (2).

$$\text{ref\_}y0 = \text{ref\_}y0' - 1 \qquad (1)$$

$$\text{ref\_}y1 = \text{ref\_}y1' + 2 \qquad (2)$$

ref_y0 and ref_y1 are the y coordinates of the RL luma picture used for the MB based up-sampling. ref_y0' and ref_y1' are the y coordinates of the RL luma picture corresponding to the y coordinates of the current MB of the EL.

As for the chroma, in the current MB, y coordinates ref_cy0' and ref_cy1' of the RL chroma picture corresponding to y coordinates cur_cy0 410 and cur_cy0+7 of the chroma picture are calculated based on H.264/AVC SVC standard. Since the chroma up-sampling uses the 2-tap bilinear filter, the y coordinates ref_cy0 and ref_cy1 of the RL chroma picture actually used for the MB based up-sampling are calculated based on Equation (3) and Equation (4).

$$\text{ref\_}cy0 = \text{ref\_}cy0' \qquad (3)$$

$$\text{ref\_}cy1 = \text{ref\_}cy1' + 1 \qquad (4)$$

ref_cy0 and ref_cy1 are the y coordinates of the RL chroma picture actually used for the MB based up-sampling. ref_cy0' and ref_cy1' are the y coordinates of the RL chroma picture corresponding to the y coordinates of the current MB of the EL.

The 4-tap filter 222 performs the intra luma up-sampling, and the 2-tap bilinear filter 223 performs the intra chroma up-sampling. The intra luma up-sampling process is now described by referring to FIG. 9.

Figure 9:
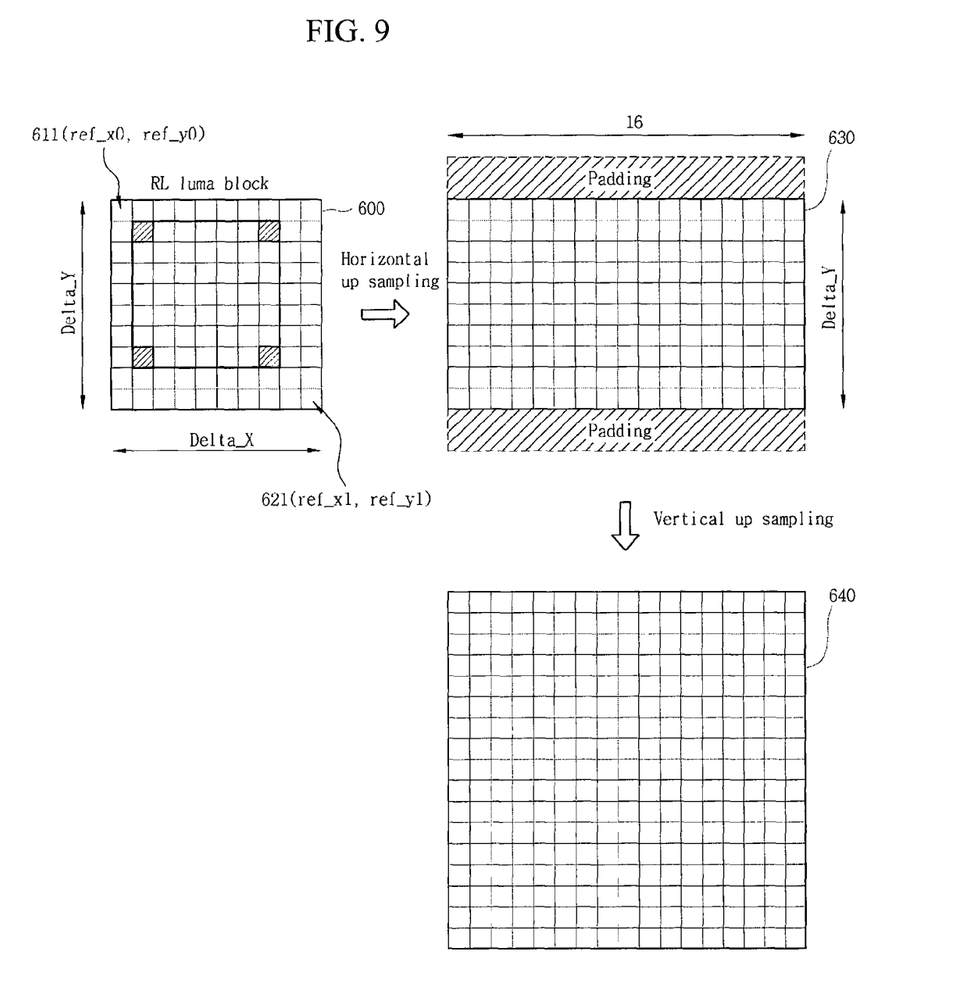
FIG. 9 is a diagram of macroblock based horizontal up-sampling and vertical up-sampling using the scalable coding method according to an exemplary embodiment of the present invention.

FIG. 9 depicts macroblock based horizontal up-sampling and vertical up-sampling of luma block using the scalable coding method according to an exemplary embodiment of the present invention.

Referring now to FIGS. 4, 5 and 9, the 4-tap filter 222 performs the MB based up-sampling based on the y coordinates ref_y0 611 and ref_y1 612 of the RL luma block 600 having the size Delta_X×Delta_Y calculated at the RL reference block coordinate calculator 221.

First, the horizontal up-sampling is carried out. The horizontal up-sampling is conducted by Delta Y in the y axis and by 16 pixels in the x axis as shown in FIG. 9. Delta1 Y is calculated based on Equation (5). After the horizontal up-sampling, if necessary, the top and bottom boundaries of the filtered block are padded. Because there are no more pixels in the top or the bottom of the picture, the padding is required for the sake of the filtering.

$$DeltaY = ref\_y1 - ref\_y0 \quad (5)$$

As for the chroma, the horizontal up-sampling is conducted by DeltaYc in the y axis and by 8 pixels in the x axis. DeltaYc is given by Equation (6).

$$DeltaYc = ref\_cy1 - ref\_cy0 \quad (6)$$

After the horizontal up-sampling, the vertical up-sampling is fulfilled using the result of the horizontal up-sampling. As for the luma, the vertical up-sampling is conducted by 16 pixels in the x axis and the y axis respectively. As for the chroma, the vertical up-sampling is conducted by 8 pixels in the x axis and the y axis respectively. The vertical up-sampling result 640 yields the predicator of I_BL MB or combined prediction MB.

Figure 7:
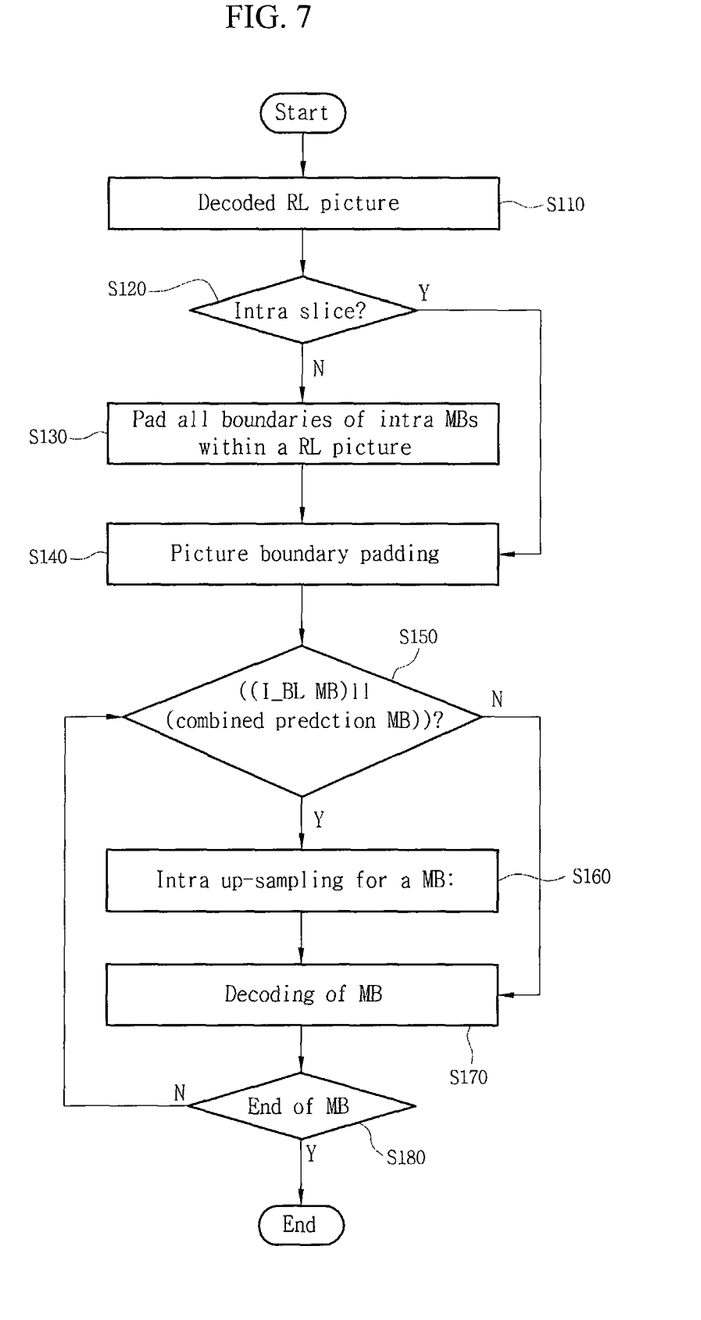
FIG. 7 is a flowchart of an intra up-sampling method in the scalable coding according to an exemplary embodiment of the present invention.

FIG. 7 is a flowchart of the intra up-sampling method in the scalable coding according to an exemplary embodiment of the present invention.

The RL picture is decoded in S110. The method determines whether the RL picture is the intra slice in S120. When the RL picture is the intra slice according to the determination result, the method performs the picture boundary padding in S140. Otherwise, the method pads all boundaries of the intra MBs of the RL picture in S130. After the preprocessing as above, the method analyzes the MB type of each MB of the EL in S150. When the MB type is I_BL MB or combined prediction MB, the method conducts the intra up-sampling in S160. When the MB type is neither I_BL MB nor combined prediction MB, the MB of the EL is decoded without the up-sampling in S170.

The conventional Picture based Intra Up-Sampling (PIC-PUS) up-samples the whole RL picture before decoding the EL picture, whereas the present method executes the up-sampling only. when the current MB type is I_BL MB or combined prediction MB in the actual decoding process of the EL picture on the MB basis, rather than the picture based. The up-sampling process of S160 is the same as described earlier.

Figure 6:
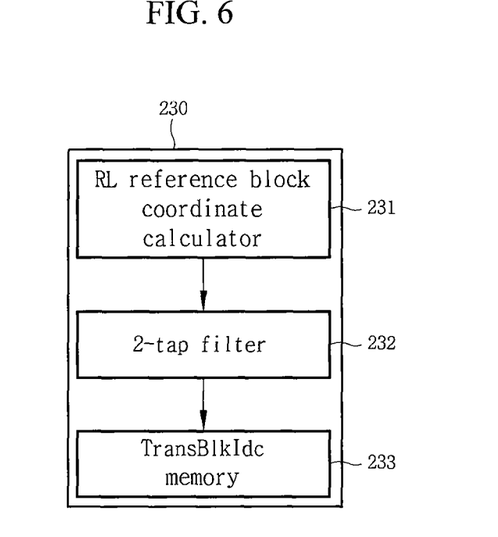
FIG. 6 is a simplified block diagram of a residual up-sampler of the scalable coding apparatus of FIG. 4.
Figure 10:
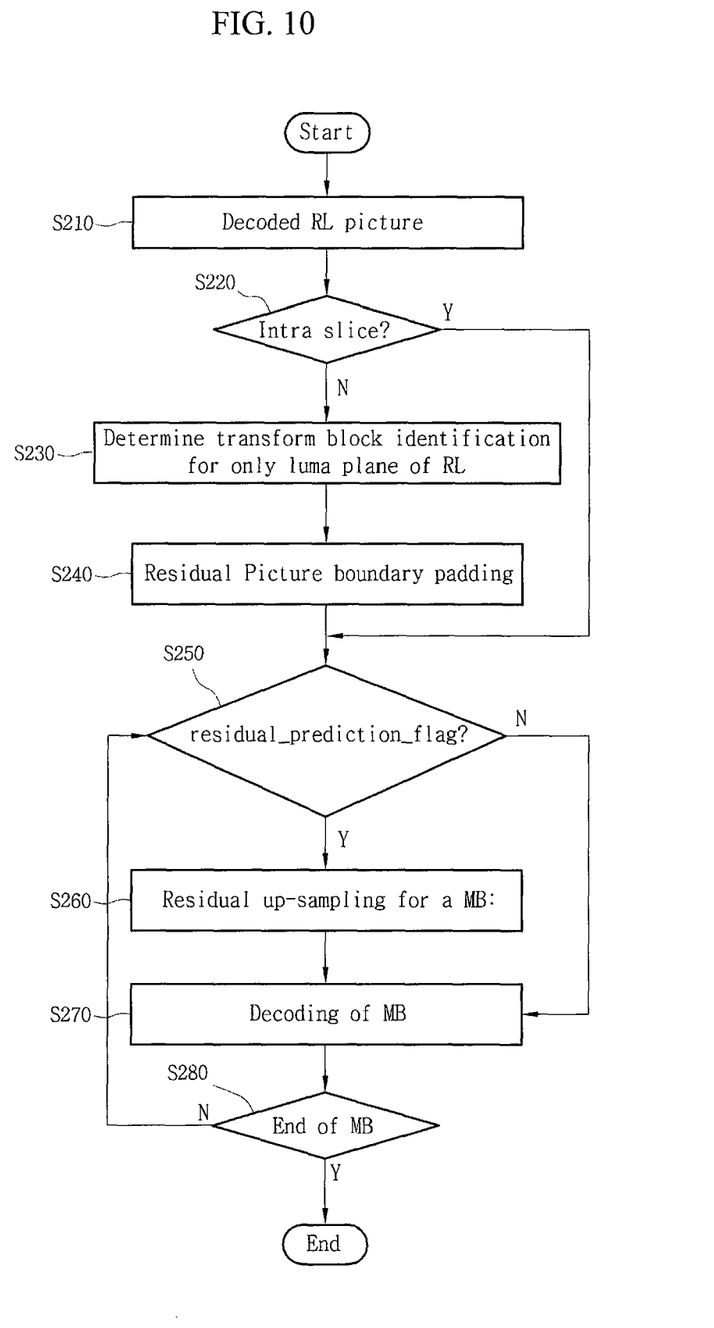
FIG. 10 is a flowchart of the residual up-sampling method in the scalable coding according to an exemplary embodiment of the present invention.

Similar to the intra up-sampling, the residual up-sampling is carried out. Referring to FIGS. 4, 6 and 10, the residual up-sampling process is explained. FIG. 6 is a simplified block diagram of the residual up-sampler of the scalable coding apparatus according to an exemplary embodiment of the present invention. Now referring to FIGS. 4 and 6, the residual up-sampler 230 includes an RL reference block coordinate calculator 231 as in the intra up-sampler. Its coordinate calculation has been illustrated earlier.

FIG. 10 is a flowchart of the residual up-sampling method in the scalable coding according to an exemplary embodiment of the present invention.

The RL picture is decoded in S210. The method determines whether the RL picture is the intra slice in S220. According to the determination result, when the RL picture is the intra slice, the residual up-sampling is unnecessary. Hence, the MB is decoded in S270 without the preprocessing. Otherwise, the method determines the transform block identification (TransBlkIdc) only for the luma plane of the RL in S230. After the preprocessing, the method analyzes the MB type of every MB of the EL in S250. When residual_prediction_flag is equal to 1 in the MB type, the residual up-sampling is carried out S260. When residual_prediction_flag is not equal to 1 in the MB type, the MB of the EL is decoded in S270 without the residual up-sampling. The conventional PIC-based Residual Up-Sampling (RUS) algorithm up-samples the RL picture before decoding the EL picture. While the present invention conducts the TransBlkIdc indication and the boundary padding in advance for the sake of the up-sampling, the residual up-sampling is applied to the MB only when residual_prediction_flag of the current MB is equal to 1 in the decoding process of the EL picture. The up-sampling of S260 is performed similar to the intra up-sampling.

FIG. 6 is a simplified block diagram of the residual up-sampler of the scalable coding apparatus according to an exemplary embodiment of the present invention. The residual up-sampling fulfilled by the residual up-sampler 230 goes through the same process as the intra up-sampling.

The residual up-sampler 230 of FIG. 6 includes the RL reference block coordinates calculator 231, a 2-tap filter 232, and a TransBlkIdc memory 233.

The RL reference block coordinate calculator 231 calculates the coordinates of the RL block to refer to in the actual residual up-sampling process as in the intra up-sampler.

When the RL block for reference is determined, the 2-tap filter 232 fulfills the residual up-sampling by referring to the RL block. The intra up-sampling process uses the 4-tap filter for the luma and 2-tap filter for the chroma, whereas the residual up-sampling process uses the 2-tap filter for the luma and the chroma alike. The residual up-sampling process differs from the intra up-sampling process in that the reference to the TransBlkIdc values is added when the up-sampling is carried out by referring to the RL block. In particular, as for the chroma, the residual up-sampling can be conducted without calculating the TransBlkIdc values and referring to the TransBlkIdc values using a storage structure (see FIG. 11A and FIG. 11B) which shall be described later.

Figure 11A:
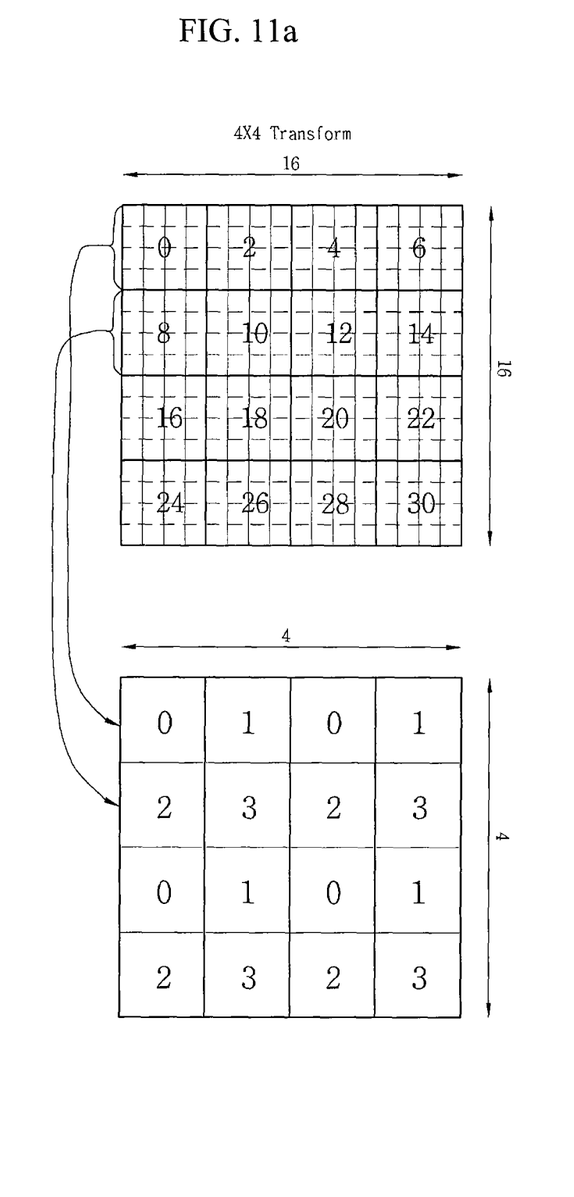
FIGS. 11A and 11B are diagrams of a memory structure of a TransBlkIdc buffer of a luma MB in the scalable coding method according to an exemplary embodiment of the present invention.
Figure 11B:
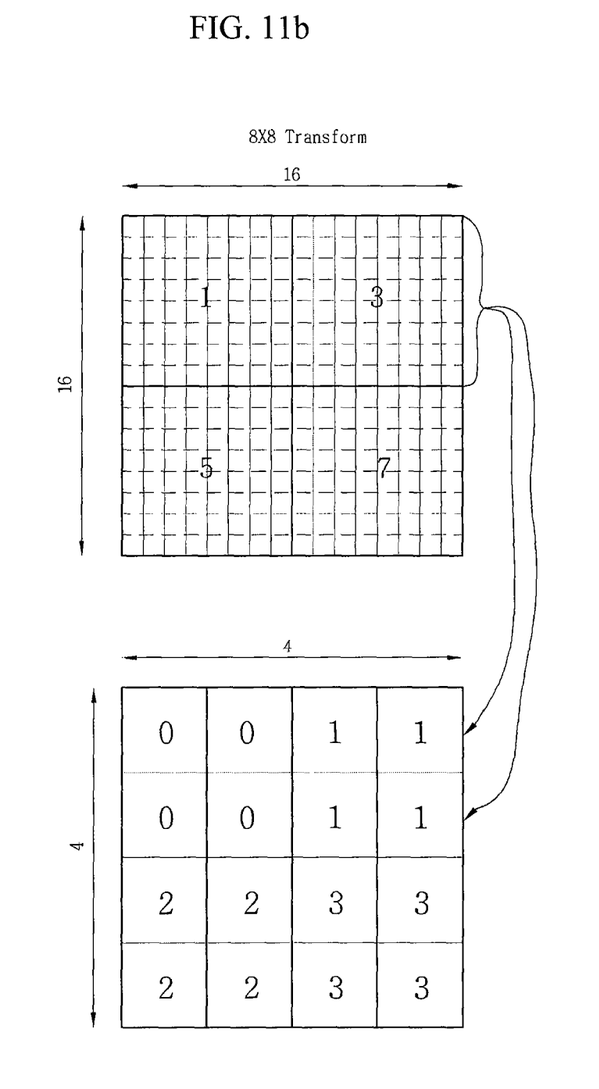

FIGS. 11A and 11B depict memory structures of a TransBlkIdc buffer of the luma MB in the scalable coding method according to an exemplary embodiment of the present invention.

The H.264/AVC SVC standard defines to refer to the TransBlkIdc values in the residual up-sampling process. The present invention alters the method for referring to the TransBlkIdc values in the residual up-sampling process by virtue of new TransBlkIdc value calculation method and a memory structure for storing the values. A pseudo code relating to the method for calculating and storing the TransBlkIdc values is shown below. m_pTransBlkIdcY is a memory storing the TransBlkIdc values of the RL in the 4×4 block unit, and tr_buf_stride is the width of the m_pTransBlkIdcY buffer.

```
T8Idc[2][4] = {{0, 0, 1, 1}, {2, 2, 3, 3}};      /*constant value*/
T4Idc[2][4] = {{0, 1, 0, 1}, {2, 3, 2, 3}};
MbIdx = 0;
for(y = 0; y < (rl_height >> 4); y++ ) { /*MB loop*/
    for(x = 0; x < (rl_width >>4); x++ ) {
        pTrBlkIdc = m_pTransBlkIdcY + (y<<2)*tr_buf_stride + (x<<2);
        if(rl_trans_sizes8[MbIdx++] ) { /*8x8 transform*/
            for(i = 0; i < 4; i++) pTrBlkIdc[0*tr_buf_stride + i] =
```

```
        T8Idc[0][i];
                 for(i = 0; i < 4; i++) pTrBlkIdc[1*tr_buf_stride + i] =
        T8Idc[0][i];
                 for(i = 0; i < 4; i++) pTrBlkIdc[2*tr_buf_stride + i] =
        T8Idc[1][i];
                 for(i = 0; i < 4; i++) pTrBlkIdc[3*tr_buf_stride + i] =
        T8Idc[1][i];
             }
         else { /*4x4 transform */
             for(i = 0; i < 4; i++) pTrBlkIdc[0*tr_buf_stride + i] =
   T4Idc[0][i];
             for(i = 0; i < 4; i++) pTrBlkIdc[1*tr_buf_stride + i] =
   T4Idc[1][i];
             for(i = 0; i < 4; i++) pTrBlkIdc[2*tr_buf_stride + i] =
   T4Idc[0][i];
             for(i = 0; i < 4; i++) pTrBlkIdc[3*tr_buf_stride + i] =
   T4Idc[1][i];
}}       }
```

In FIGS. 11A and 11B, as referring to the TransBlkIdc values in the transform block boundary, the TransBlkIdc values are referred to only in the transform block boundary for the luma and the TransBlkIdc value are not referred to for the chroma.

The H.264/AVC SVC standard performs operates the 2-tap filter within the transform block and selects one of two pixels as the result value in the transform block boundary. Within the transform block, the TransBlkIdc values for the two pixels input to the 2-tap filter are identical. In the transform block boundary, the TransBlkIdc values for the two pixels input to the 2-tap filter are different from each other.

Using the identical TransBlkIdc values inside the 4×4 block, the present invention refers to the TransBlkIdc values only in the 4×4 block boundary and does not refer to the TransBlkIdc values within the 4×4 in order to increase the operation speed.

The H.264/AVC standard defines to use only the 4×4 transform block for the chroma. Accordingly, the 4×4 block boundary is recognized as the transform block boundary and thus there is no need to refer to TransBlkIdc.

As such, the calculation method of the new TransBlkIdc values and the memory structure used in the residual up-sampling are shown in the lower parts of FIGS. 11A and 11B. Now, the TransBlkIdc value calculation method and the memory structure are provided.

Still referring to FIGS. 11A and 11B, the upper parts of FIGS. 11A and 11B show the memory structures used in the H.264/AVC SVC standard and the JSVM. The memory structures used in the H.264/AVC SVC standard and the JSVM calculate and store the TransBlkIdc values in every pixel of the luma and the chroma of the RL. That is, the memory stores 256 data for the luma and 64 data for the chroma per MB. Since the TransBlkIdc values gradually increase in every MB, 4-bit storage space per data is required.

The TransBlkIdc memory structures in the lower parts of FIGS. 11A and 11B store only one TransBlkIdc value per 4×4 block, rather than storing TransBlkIdc for every pixel. This is because the TransBlkIdc value can differ only in the 4×4 block boundary. The TransBlkIdc values can be set to four values such as 0, 1, 2 and 3. 0, 1, 2 and 3 are enough to distinguish the boundary of the transform block. The TransBlkIdc values are not limited to 0, 1, 2 and 3. For example, the TransBlkIdc values can be 7, 8, 9 and 10. Namely, the TransBlkIdc values can be set to four different constant values without separate calculations.

Since the chroma makes use of only the 4×4 transform block, the 4×4 block boundary becomes the transform block boundary. Naturally, the TransBlkIdc values are not calculated or stored. The TransBlkIdc memory structure of the present invention is applied only to the luma, and the memory usage can be saved and the operation speed can be enhanced by omitting the TransBlkIdc value calculation and storing for the chroma.

Embodiments are described herein using pseudo-code. Other programming code, steps, ordering or steps, programming languages, types of instruction sets, and/or minimum numbers of non-neighboring entries may be used.

The following pseudo-code describes the embodiment for MB-based up-sampling.

The pseudo-code of the MB based intra horizontal up-sampling for example as follows:

```
1: pSrc = (rl_pic_buffer + ref_y0 * rl_pic_stride);
2: pDst = &m_HorTmpBufMB[16*2];
3: for(y = ref_y0; y <= ref_y1; y++) {
4:      for(i = 0, x = cur_x0; i < (luma ? 16 : 8) i++, x++) {
5:          if(luma) {
6:              p = (m_xPosY[x] & 15); r = (m_xPosY[x] >> 4);
7:              pDst[i] = eF[p,0]*pSrc[r−1] + eF[p,1]*pSrc[r+0]
                +eF[p,2]*pSrc[r+1]
                        + eF[p,3]*pSrc[r+2]; }
8:          else { /* chroma */
9:              p = (m_xPosC[x] & 15); r = (m_xPosC[x] >> 4);
10:             pDst[i] = (16 − p)*pSrc[r] + p*pSrc[r+1];}
11: }
12: pSrc += rl_pic_stride;
13: pDst += 16; /* stride of m_HorTmpBufMB*/
14: }
``` ref_pic_buffer is a picture buffer of the RL, ref_pic_stride is a stride of the RL picture buffer, and m_HorTmpBufMB[ ] is a temporary MB buffer for storing the horizontal filtering result. m_xPoxY[ ] and m_xPosC[ ] are x coordinates of the RL picture with respect to the x coordinates of Y and Cb/Cr of the pre-calculated EL picture, wherein the coordinates have the 1/16 pixel precision. eF[p,x] is coefficient arrangement of the 16-phase luma interpolation filter. In the initialization, pSrc indicates the first pixel position of the ref_y0 line of FIG. 8 in the RL intra pixel buffer, and pDst indicates the first pixel position in the third line of the temporary MB buffer. The first line and the second line are the space for the padding which is performed if necessary.

The pseudo-code of the MB based intra luma vertical up-sampling for example as follows:

```
1: pDst = el_pic_buffer;
2: for(y = cur_y0; y < cur_y0 + (luma ? 16 : 8) y++) {
3:     if(luma) {
4:         p = (m_yPosY[y] & 15); r = (m_yPosY[y] >> 4);
5:         pSrc = (&m_HorTmpBufMB[16*2] + (r - ref_y0) * 16);
6:         for(x = 0; x < 16; x++) {
7:             pDst[x] = Clip3(0, 255, ((eF[p,0]*pSrc[x-16] +
                   eF[p,1]*pSrc[x+0] +
                   eF[p,2]*pSrc[x+16] + eF[p,3]*pSrc[x+32] +
       512)>>10)); }
8:     }
9:     else { /* chroma */
10:        p = (m_yPosC[y] & 15); r = (m_yPosC[y] >> 4);
11:        pSrc = (&m_HorTmpBufMB[16*2] +
                  (r - ref_y0) * 16);
12:        for(x = 0; x < 8 x++)
13:            pDst[x] = ((16 - p)*pSrc[x] +
                   p*pSrc[x+16] + 128)>>8);
14:    }
15:    pDst += el_pic_stride;
16: }
``` el_pic_buffer is the picture buffer of the EL and el_pic_stride is the stride of the EL picture buffer. m_yPoxY[ ] and m_yPosC[ ] are the same as in FIG. 12A. In the initialization, pDst indicates the position of the top leftmost pixel of the current MB of the pixel buffer of the EL.

The pseudo-code of the MB based residual horizontal up-sampling for example as follows:

```
1: pSrc = (rl_pic_buffer + ref_y0 * rl_pic_stride);
2: pDst = &m_HorTmpBufMB[16*2];
3: for(y = ref_y0; y <= ref_y1; y++) {
4:     pTrBlkIdc=(m_pTrBlkIdcY+(y >>2) *tr_buf_stride);
5:     for(i = 0, x = cur_x0; i < (luma ? 16 : 8) i++, x++) {
6:         if(luma) {
7:             p = (m_xPosY[x] & 15); r = (m_xPosY[x] >> 4);
8:             if((r&3)!=3) /* within a 4 x4 or 8x8 transform block*/
9:                 pDst[i] = (16-p) *pSrc[r] + p*pSrc[r+1];
10:            else {
11:                if(pTrBlkIdc[(r >>2)]=pTrBlkIdc[(r >>2)+1])
12:                    pDst[i] = (16 - p)*pSrc[r] + p*pSrc[r+1];
13:                else pDst[i] = (pSrc[r+(r >>3)] <<4);
14:            }}
15:        else { /*chroma*/
16:            p = (m_xPosC[x] & 15); r = (m_xPosC[x] >> 4);
17:            if((r&3)!=3) /* within a 4 x4 transform block*/
18:                pDst[i] = (16-p) *pSrc[r] + p*pSrc[r+1]
19:            else pDst[i] = (pSrc[r+(r >>3)] <<4);
20:        }}
21:    pSrc += rl_pic_stride;
22:    pDst += 16; /* stride of m_HorTmpBufMB*/
23: }
``` ref_pic_res_buffer is the residual buffer of the RL and ref_pic_res_stride is the stride of the RL residual buffer. In the initialization, pSrc indicates the first pixel position of the ref_y0 line of FIG. 8 in the RL residual pixel buffer, and pDst indicates the first pixel position of the third line of the temporary MB buffer. The first line and the second line are the space for the padding which is performed if necessary.

The pseudo-code of the MB based residual vertical up-sampling for example as follows:

```
1: pDst = el_pic_res_buffer;
2: for(y = cur_y0; y < cur_y0 + (luma ? 16 : 8); y++) {
3:     if(luma) {
4:         p = (m_yPosY[y] & 15); r = (m_yPosY[y] >> 4);
5:         pSrc = (&m_HorTmpBufMB[16*2] + (r - ref_y0) * 16);
6:         if((r&3)!=3) /* within a 4 x4 or 8x8 transform block*/
7:             for(i=0; i<16; i++)
8:                 pDst[i] = ((16-p) *pSrc[i] + p*pSrc[i+16]+128) >>8;
9:             pDst+=el_pic_res_stride; }
10:        else {
11:            pTrBlkIdc=(m_pTrBlkIdcY+(y >>2) *tr_buf_stride ;
12:            for(i=0, x=cur_x0; i<16;i++,x++) {
13:                RndBx=(((m_xPosY[x] >>4)+((m_xPosY[x]&15) >>3)) >>2);
14:                if(pTrBlkIdc[RndBx]=pTrBlkIdc[RndBx +tr_buf_stride])
15:                    pDst[i] = ((16 - p)*pSrc[i] + p*pSrc[i+16]+128) >>8;
16:                else pDst[i] = (pSrc[i+((p >>3) * 16]+8) >>4); }
17:        }}
18: else { /* chroma */
19:     p = (m_yPosC[y] & 15); r = (m_yPosC[y] >> 4);
20:     pSrc = (&m_HorTmpBufMB[16*2] + (r - ref_y0) * 16);
21:     if((r&3)!=3) /* within a 4 x4 transform block*/
22:         for(i=0; i<8;i++)
23:             pDst[x] = ((16 - p)*pSrc[x] + p*pSrc[x+16] + 128)>>8);
24:     else{
25:         for(i=0; i<8;i++)
26:             pDst[i] = (pSrc[i+((p >>3) * 16]+8) >>4); }
27:     }
28:     pDst += el_pic_res_stride;
29: }
``` el_pic_res_buffer and el_pic_res_stride are the same as described earlier.

The TransBlkIdc memory structure and the TransBlkIdc value referring method in the residual up-sampling; that is, the up-sampling method for referring to the TransBlkIdc values only in the 4×4 block boundary for the luma and not referring to the TransBlkIdc values for the chroma are not limited to the MB based residual up-sampling method but applicable to the Picture-based Residual Up-Sampling (PIC-RUS) method.

The present invention, which is suited for the H.264/AVC SVC standard, is applicable to the field requiring the SVC; that is, to the digital multimedia field such as IPTV, mobile IPTV, mobile broadcasting, home network wireless LAN video, and videophone/videoconference.

In light of the foregoing as set forth above, the execution speed of the scalable video codec can be raised. For example, the decoder enhances the decoding speed over 60%.

The memory usage required for the spatial inter-layer prediction of the scalable video can be reduced.

The scalable video coding method of the present invention can be applied to both of the encoding and the decoding.

Exemplary embodiments of the present invention can improve the inter-layer prediction for the MB in the ESS.

The present invention is provided in the general context of the steps of the method which can be implemented in exemplary embodiments through a program product including computer executable instructions such as program code realized in a computer-readable medium and executed by computers under the network environment. Examples of the computer-readable media includes, but not limited to, electronic device memory units, Random Access Memories (RAMs), Read Only Memories (ROMs), Compact Discs (CDs), Digital Versatile Discs (DVDs), and other embedded or external storage devices, and can include a variety of storage media. In general, program modules include routines, programs, objects, components, and data structure for executing particular tasks or implementing particular abstract data types. Computer-executable instructions, relevant data structures, and program modules are examples of the program code for fulfilling the steps of the present methods. A particular sequence of the executable instructions or the relevant data structure indicates examples of corresponding operations for realizing the functions of those steps.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A scalable video coding method comprising:
    generating a base layer and an enhancement layer from an input video signal;
    dividing the enhancement layer into a plurality of macroblocks;
    determining when a base_mode_flag of a current macroblock among the macroblocks in the enhancement layer is equal to 1;
    when it is determined the base_mode_flag of the current macroblock of the enhancement layer is equal to 1, up-sampling a macroblock of a reference layer using coordinates of a reference block of the reference layer which is referred to in up-sampling the current macroblock of the enhancement layer; and
    coding the up-sampled current macroblock of the enhancement layer.

2. The scalable video coding method of claim 1, wherein the up-sampling comprises:
    if the base_mode_flag of the current macroblock of the enhancement layer is equal to 1 and if a type of a corresponding block of the reference layer, having the same location as the current macroblock of the enhancement layer, is intra, performing a first intra up-sampling step for intra up-sampling the corresponding block of the reference layer for inter-layer prediction.

3. The scalable video coding method of claim 1, wherein the up-sampling comprises:
    if the base_mode_flag of the current macroblock of the enhancement layer is equal to 1, if a type of a corresponding block of the reference layer, having the same location as the current macroblock of the enhancement layer, is inter, and if the corresponding block of the reference layer comprises at least one intra pixel, performing a second intra up-sampling step for intra up-sampling the corresponding block of the reference layer for inter-layer prediction.

4. The scalable video coding method of claim 2, wherein the intra up-sampling comprises:
    calculating the coordinates of the reference block of the reference layer; and
    up-sampling the macroblock of the reference layer based on the coordinates of the reference block of the reference layer.

5. The scalable video coding method of claim 1, further comprising:
    decoding a picture of the reference layer; and
    if the picture of the reference layer is an intra slice, boundary-padding the picture.

6. The scalable video coding method of claim 5, further comprising:
    if a picture of the reference layer is not the intra slice, padding all boundaries of intra macroblocks within the picture of the reference layer.

7. The scalable video coding method of claim 4, wherein the calculating of the coordinates of the reference block of the reference layer comprises:
    calculating coordinates of the macroblock of the reference layer corresponding to the current macroblock of the enhancement layer; and
    calculating the coordinates of the reference block of the reference layer which is referred to in the up-sampling the current macroblock of the enhancement layer, using the calculated coordinates of the macroblock of the reference layer corresponding to the current macroblock of the enhancement layer.

8. The scalable video coding method of claim 7, wherein the intra up-sampling up-samples at least one of an intra luma sample and intra chroma sample.

9. The scalable video coding method of claim 8, wherein the up-sampling the intra luma sample uses a 4-tap filter, if the intra up-sampling up-samples the intra luma sample, and
    wherein the up-sampling the intra chroma sample uses a 2-tap bilinear filter, if the intra up-sampling up-samples the intra chroma sample.

10. The scalable video coding method of claim 1, wherein the up-sampling comprises:
    horizontally up-sampling the macroblock of the reference layer using the coordinates of the reference block of the reference layer; and
    vertically up-sampling the macroblock of the reference layer using the coordinates of the reference block of the reference layer.

11. The scalable video coding method of claim 10, wherein the up-sampling up-samples at least one of a luma sample and a chroma sample.

12. The scalable video coding method of claim 1, wherein the up-sampling comprises:
    if the residual_prediction_flag is equal to 1, a residual up-sampling step for up-sampling a residual block of the reference layer for inter-layer prediction.

13. The scalable video coding method of claim 12, wherein the residual up-sampling step comprises:
    performing the up-sampling of the residual block by referring to Transform Block Identification (TransBlkIdc) values.

14. The scalable video coding method of claim 13, wherein the TransBlkIdc values are stored to a TransBlkIdc memory which stores different TransBlkIdc values per 4×4 pixel block.

15. The scalable video coding method of claim 14, wherein the TransBlkIdc values stored to the TransBlkIdc memory are calculated for a luma sample, and the TransBlkIdc values are not calculated and stored for a chroma sample.

16. The scalable video coding method of claim 14, wherein the TransBlkIdc values stored to the TransBlkIdc memory are four constant values.

17. The scalable video coding method of claim 13, wherein the TransBlkIdc values are referred to in a 4×4 block boundary if the current macroblock of the enhancement layer is a luma sample, and the TransBlkIdc values are not referred to if the current macroblock of the enhancement layer is a chroma sample.

18. The scalable video coding method of claim 12, wherein the residual up-sampling step further comprises:
    decoding a picture of the reference layer;
    boundary-padding the picture of the reference layer; and
    calculating and storing TransBlkIdc values of the picture of the reference layer.

19. A scalable video coding apparatus comprising:
    a downsampler for reading a video signal and generating a base layer and an enhancement layer;
    a macroblock type determiner for determining a type of a current macroblock of the enhancement layer divided into macroblocks;
    an intra up-sampler for, up-sampling a macroblock of a reference layer, when the macroblock type determiner determines that a base_mode_flag of the current macroblock of the enhancement layer is equal to 1 and a type of corresponding block of the reference layer, having the same location as the current macroblock of the enhancement layer and referred to in up-sampling the current macroblock of the enhancement layer, is intra, or when the macroblock type determiner determines that the base_mode_flag is equal to 1, the type of the corresponding block of the reference layer is inter, and the corresponding block of the reference layer comprises at least one intra pixel;
    a residual up-sampler for up-sampling a residual block of the reference layer, when the macroblock type determiner determines that the residual_prediction_flag of the current macroblock of the enhancement layer is equal to 1; and
    a coder for coding the up-sampled current macroblock of the enhancement layer.

20. The scalable video coding apparatus of claim 19, further comprising:
    a preprocessor for boundary-padding a picture of the reference layer if the picture of the reference layer referred to in the up-sampling of the current macroblock of the enhancement layer is an intra slice, and padding all boundaries of intra macroblocks of the picture if the picture is not the intra slice.

21. The scalable video coding apparatus of claim 19, wherein the intra up-sampler comprises:
    a reference block coordinate calculator for calculating coordinates of a reference block of the reference layer referred to in the up-sampling the current macroblock of the enhancement layer;
    a 4-tap filter for up-sampling a luma sample; and
    a 2-tap filter for up-sampling a chroma sample.

22. The scalable video coding apparatus of claim 19, wherein the residual up-sampler comprises:
    a reference block coordinate calculator for calculating coordinates of a reference block of the reference layer referred to in the up-sampling the current macroblock of the enhancement layer;
    a 2-tap bilinear filter for up-sampling a luma sample and a chroma sample; and
    a TransBlkIdc memory for storing TransBlkIdc values as different values per 4×4 pixel block, the TransBlkIdc values referred to in a boundary of a transform block, if the current macroblock of the enhancement layer is the luma sample.

23. A non-transitory computer-readable recording medium containing a program which executes a scalable video coding method comprising:
    generating a base layer and an enhancement layer from an input video signal;
    dividing the enhancement layer into a plurality of macroblocks;
    determining when a base_mode_flag of a current macroblock among the macroblocks in the enhancement layer is equal to 1;
    when it is determined the base_mode_flag of the current macroblock of the enhancement layer is equal to 1, up-sampling a macroblock of a reference layer using coordinates of a reference block of the reference layer which is referred to in up-sampling the current macroblock of the enhancement layer; and
    coding the up-sampled current macroblock of the enhancement layer.

24. The scalable video coding method of claim 1, wherein the macroblock of the reference layer, which is up-sampled, is different from the reference block of the reference layer which is referred to in the up-sampling the current macroblock of the enhancement layer.

25. The scalable video coding apparatus of claim 21, wherein the macroblock of the reference layer, which is up-sampled, is different from the reference block of the reference layer which is referred to in the up-sampling the current macroblock of the enhancement layer.

26. The non-transitory computer-readable recording medium of claim 23, wherein the macroblock of the reference layer, which is up-sampled, is different from the reference block of the reference layer which is referred to in the up-sampling the current macroblock of the enhancement layer.

* * * * *